(12) United States Patent
Foti

(10) Patent No.: US 8,782,195 B2
(45) Date of Patent: Jul. 15, 2014

(54) GROUP OPERATIONS IN MACHINE-TO-MACHINE NETWORKS USING A SHARED IDENTIFIER

(75) Inventor: George Foti, Dollard des Ormeaux (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 107 days.

(21) Appl. No.: 13/420,241

(22) Filed: Mar. 14, 2012

(65) Prior Publication Data
US 2013/0246519 A1    Sep. 19, 2013

(51) Int. Cl.
*G06F 15/16*    (2006.01)
(52) U.S. Cl.
USPC ............................... 709/223; 709/204
(58) Field of Classification Search
USPC ............... 709/224, 223, 204; 726/2, 6
See application file for complete search history.

(56) References Cited

U.S. PATENT DOCUMENTS

| | | | |
|---|---|---|---|
| 8,407,769 B2 * | 3/2013 | Salmela et al. | 726/6 |
| 2006/0126649 A1 * | 6/2006 | Akiyoshi | 370/401 |
| 2008/0008106 A1 * | 1/2008 | Boberg et al. | 370/270 |
| 2009/0150789 A1 * | 6/2009 | Regnier | 715/736 |
| 2009/0217348 A1 * | 8/2009 | Salmela et al. | 726/2 |
| 2011/0268047 A1 * | 11/2011 | Nath et al. | 370/329 |
| 2012/0047558 A1 * | 2/2012 | Sundaram et al. | 726/3 |
| 2012/0096154 A1 * | 4/2012 | Chen et al. | 709/224 |
| 2012/0124201 A1 * | 5/2012 | Muhanna et al. | 709/224 |
| 2013/0017827 A1 * | 1/2013 | Muhanna et al. | 455/426.1 |
| 2013/0041997 A1 * | 2/2013 | Li et al. | 709/223 |
| 2013/0188515 A1 * | 7/2013 | Pinheiro et al. | 370/254 |
| 2013/0189955 A1 * | 7/2013 | Horn et al. | 455/411 |
| 2013/0246504 A1 * | 9/2013 | HU et al. | 709/203 |

FOREIGN PATENT DOCUMENTS

WO    2011/112683 A1    9/2011

OTHER PUBLICATIONS

ETSI TS 102 690 V2.0.3, Machine-to-Machine communications (M2M); Functional architecture, Apr. 2012, pp. 1-284. The upload server date of that version is Mar. 12, 2012.
Barbara Pareglio, Overview of ETSI M2M Architecture, Oct. 2011, pp. 1-20.
International Search Report from PCT/IB2013/051870.

* cited by examiner

*Primary Examiner* — Krisna Lim
(74) *Attorney, Agent, or Firm* — David Rahmer; Ericsson Canada Inc.

(57) ABSTRACT

In a Machine-to-Machine (M2M) network, efficient subscription of a M2M network application to a potentially very large number of device applications executing on remote devices is facilitated by the use of a shared "link-subscription identifier." Each related device application (e.g., utility meter reading applications) includes a shared link-subscription identifier in its registration to a M2M network gateway or a M2M services capability (SC). The gateways maintain a binding between link-subscription identifiers in the device applications associated with them. To subscribe to all related device applications, a network application includes the link-description identifier in a subscription request to the M2M SC. The M2M SC, in turn, includes the link-subscription identifier in subscription requests it forwards to gateways and directly-connected remote devices. If the link-subscription identifier is one that is maintained locally by a gateway, the gateway forwards the subscription request to all remote devices executing associated device applications.

18 Claims, 7 Drawing Sheets

GROUP OPERATIONS IN MACHINE-TO-MACHINE NETWORKS USING A SHARED IDENTIFIER

TECHNICAL FIELD

The present invention relates generally to Machine-to-Machine (M2M) communication networks, and in particular to a system and method of efficient communication between a network application and a large number of M2M device applications, via use of a common link-subscription identifier.

BACKGROUND

Machine-to-Machine communications (M2M) is a relatively recent development in the wireless communication arts, which by many estimates is poised for explosive growth. M2M communications (or simply, "M2M") is the networking of intelligent, communications-enabled remote assets via an information technology infrastructure, including for example, cellular wireless communication networks. M2M allows information to be exchanged automatically without human intervention, and covers a broad range of technologies and applications.

In many of these applications, remote devices monitor physical conditions (e.g., temperature, location, consumption/inventory, light, movement/acceleration, altitude, and speed), or health status (e.g., heart rate, body temperature, and the like), and report the conditions to a central application.

Remote devices executing M2M applications may include sensors and/or processing devices embedded in car and truck fleets, utility meters, copiers/printers, kiosks, security and fire alarm systems, ventilation and air-conditioning sensors, medical devices, fitness monitors, CCTV cameras, and the like. M2M network applications receiving data from M2M device applications executing on such remote devices may relate to security (access control, fire and burglar alarms), tracking and tracing (fleet management, inventory control, traceable animal collars), metering (power, gas, water), consumer devices (navigation units, e-books, fitness monitors), healthcare, and the like. In general, a remote device may execute one or more device applications. Each device application is identified by a unique application identifier.

Standards for the M2M resources and protocols in wireless networks are evolving. A M2M architecture provides a generic set of capabilities for M2M services, independently of the underlying network. Network applications may then be written to take advantage of these services, such as device discovery, device registration, application registration, subscription management, notification management, device location, device management, application life cycle management, communications primitives such as read and write requests, and the like.

In some M2M scenarios, a typical need is for a network application to exchange information with (e.g., periodically collect data from) all, or a large number of, related device applications. For example, a network application for utility metering instructs all remote devices (i.e., automated meters) in a certain region to report a reading, or a network application for fleet management instructs all remote devices (i.e., navigation and engine monitoring devices embedded in trucks) to report a variety of status parameters (location, speed, engine temperature, etc.).

Such network applications typically first discover all remote devices in the relevant region, and then also typically know when they are registered or online so that the network application can communicate with them. In order to receive registration status, the network application must subscribe to the registration status after it discovers the remote devices. Discovery is essential so that the network application can know where to send the subscription for the registration status. There can be thousands of utility meters in a region, or trucks on the roads at any given time. Thus, it is clear that the overhead for network applications monitoring and communicating with large numbers of devices can be immense.

SUMMARY

According to one or more embodiments described and claimed herein, the efficient subscription of a M2M network application to a potentially very large number of device applications executing on remote devices (some of which may be "hidden" behind gateways) is facilitated by the use of a shared identifier, referred to herein as a "link-subscription identifier." Each related device application (e.g., utility meter reading applications) includes a shared link-subscription identifier in its registration to a M2M network gateway or a M2M services capability (SC). The gateways maintain a binding between link-subscription identifiers in the device applications associated with them. To subscribe to all related device applications, a network application includes the link-description identifier in a subscription request to the M2M SC. The M2M SC, in turn, includes the link-subscription identifier in subscription requests it forwards to gateways and directly-connected remote devices. If the link-subscription identifier is one that is maintained locally by a gateway, the gateway forwards the subscription request to all remote devices executing associated device applications. In one embodiment, upon registering to the M2M SC, gateways and remote devices include a link-subscription inventory attribute listing the link-subscription identifiers maintained locally. In this embodiment, the M2M SC only forwards the subscription request to those gateways and remote devices for which the relevant link-subscription identifier is included in the link-subscription inventory attribute.

One embodiment relates to a method, executed by a M2M SC, of subscribing a plurality of M2M device applications executing on remote devices. A registration is accepted from a M2M network application, the registration including a link-subscription identifier associated with a plurality of device applications. Subsequently, a subscription request is accepted from the M2M network application, the subscription request including the link-subscription identifier. Subscription requests are issued to a plurality of gateways or devices registered to the M2M SC, the subscription requests including the link-subscription identifier.

Another embodiment relates to a method, executed by a M2M network gateway, of subscribing one or more device applications executing on remote devices to a M2M network application. The gateway registers to a M2M SC. A registration request is accepted from a device application executing on a remote device, the registration request including an application identifier unique to the device application and a link-subscription identifier common to a plurality of related device applications. A binding is maintained between each link-subscription identifier and all application identifiers of device applications, the registration request from which included the link-subscription identifier. A subscription request is received from the M2M SC, the subscription request including a first link-subscription identifier. A subscription request is issued to each registered device application whose application identifier is bound to the first link-subscription identifier.

Yet another embodiment relates to a network node executing M2M Service Capability (SC). The node included one or more network interfaces, memory, and a controller operative to execute one or more programs. The programs are operative to accept a registration from a M2M network application, the registration including a link-subscription identifier associated with a plurality of device applications; subsequently accept a subscription request from the M2M network application, the subscription request including the link-subscription identifier; and issue subscription requests to a plurality of gateways or devices registered to the M2M SC, the subscription requests including the link-subscription identifier.

Still another embodiment relates to a M2M network gateway operative to register to a M2M SC. The gateway includes one or more network interfaces, memory, and a controller operative to execute one or more programs. The programs are operative to register to a M2M SC; accept a registration request from a device application executing on a remote device, the registration request including an application identifier unique to the device application and a link-subscription identifier common to a plurality of related device applications; maintain a binding between each link-subscription identifier and all application identifiers of device applications, the registration request from which included the link-subscription identifier; receive a subscription request from the M2M SC, the subscription request including a first link-subscription identifier; and issue a subscription request to each registered device application whose application identifier is bound to the first link-subscription identifier.

DETAILED DESCRIPTION

Figure 1:
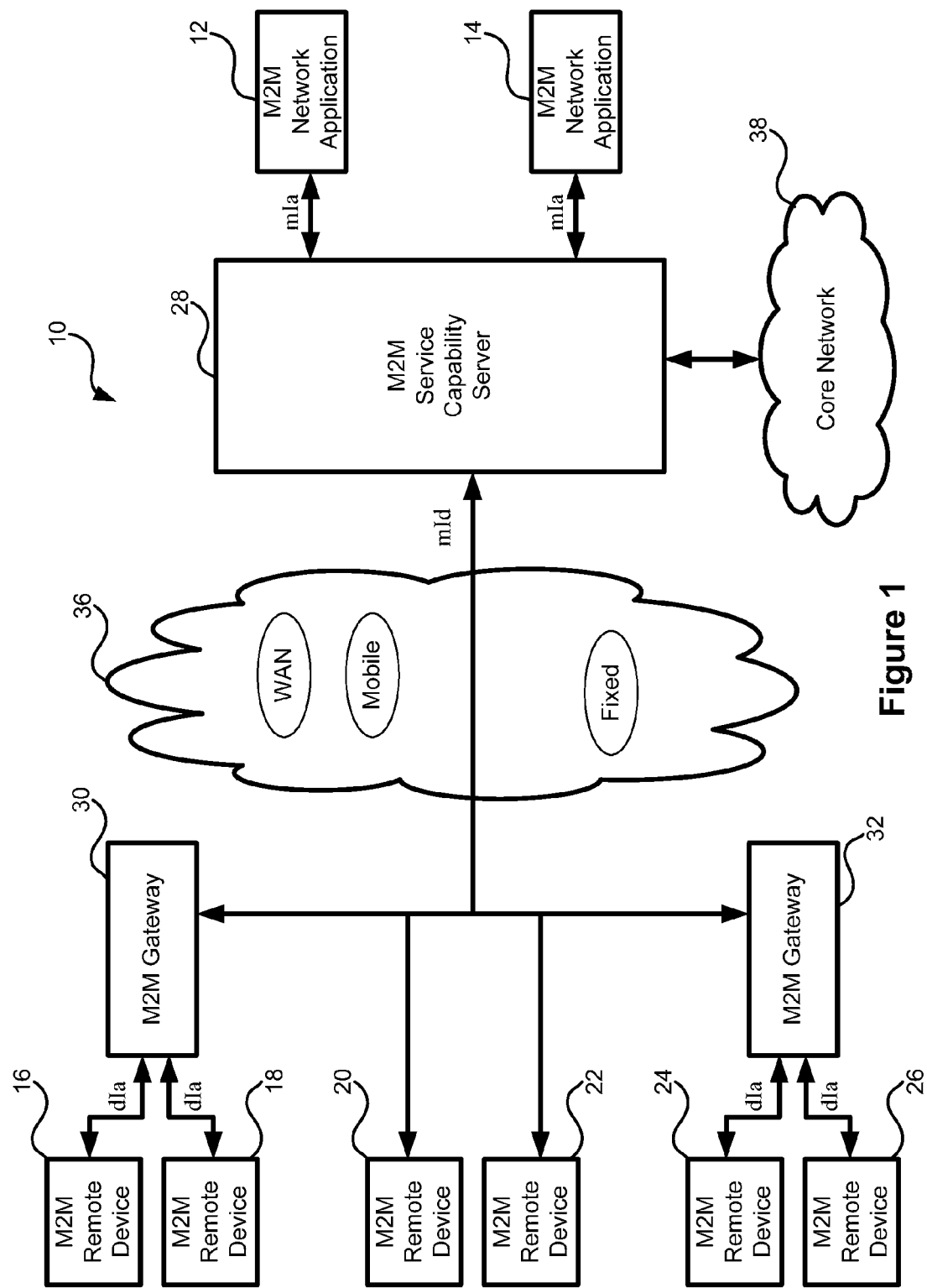
FIG. 1 is a functional block diagram of a M2M network.

FIG. 1 depicts the functional elements of a M2M network 10. The M2M network 10 provides machine-to-machine (i.e., human-independent) communication between network applications 12, 14 and device applications executing on remote devices 16, 18, 20, 22, 24, 26. Central to this communication is the functionality M2M Service Capability Server (SC) 28. Some remote devices 20, 22 connect directly to the M2M SC 28, via an access network 36, which may comprise a WAN, wireless mobile network, fixed network, or like.

In other cases, remote devices 16, 18 connect to a M2M gateway 30, and remote devices 24, 26 connect to M2M gateway 32, and the gateways 30, 32 connect to the M2M SC 28 (via an access network 36). For example, a building may include a large number of remote devices 16, 18 or 24, 26, such as sensors monitoring temperature, lighting, occupancy (via ultrasonic sensors); utility meters recording electricity, gas, and water usage readings; alarms such as burglar, fire, or smoke alarms; and various "smart" appliances or equipment (e.g., vending machines reporting inventory status). To avoid allocating a proliferation of network resources (e.g., IP addresses or SIM cards), some or all such remote M2M devices 16, 18, 24, 26 may be connected to gateways 30, 32, rather than directly to the access network 36. The remote devices 16, 18, 24, 26 may communicate with their respective gateways 30, 32 using a variety of local network technologies, e.g., WiFi, Bluetooth, ZigBee, or the like—such details are not germane to embodiments of the invention described herein, and are not further explained. M2M devices connected to a gateway are not necessarily visible to the network and in such a case communicate to the network through the gateway. However, their activities can be announced to the M2M SC 28 through the gateway, for example the registration of such an M2M device can be announced to the M2M SC 28.

The M2M SC 28 may also connect to a core network 38, such as the core network of a mobile network (e.g., LTE, WCDMA), the Internet, or the like.

As described above, the M2M SC 28 provides a variety of M2M-related services to network applications 12, 14 to gateways 30, 32 and the devices 16, 18, 26 and 26 connected to them, to devices 20, 33 and to the applications resident on the device and gateways. As one example, a network application 12, 14 may subscribe to the registration status of one or more devices 20, 22, or the registration status of one or more of the gateways 30, 32. In this subscription, the M2M SC 28 notifies the network application 12, 14 when a subscribed device registers with the M2M SC 28 (such as when the corresponding remote devices 16-26 is powered on, or moves within range of a wireless access network 36). As another example, network application 12, 14 may send a service discovery request to the M2M SC 28 to locate the addressing information for an M2M device. This M2M device could be behind a gateway 16-18, 24-26 or just connected to the M2M SC 28 via an access network 20-22. M2M devices typically have search strings that can be used for service discovery purposes when they register. The addressing information of any M2M device regardless if it connected to a gateway or via an access network to the M2M SC is essential to be able to subscribe the registration status for the M2M device so that the subscription request can be sent to the proper target.

According to embodiments of the present invention, a link-subscription identifier facilitates communications between a network application 12, 14 and a potentially large plurality of device applications executing on remote devices 16-26. In particular, a common link-subscription identifier is a shared by all related device applications and a related network application 12, 14. As used herein, "related" device applications those that are functionally and/or communicatively related to the relevant network application 12, 14, such as all utility meter reading applications in a region, all location and parameter sensor applications embedded in active trucks in a fleet, or the like. The link-subscription identifier is used by the M2M SC 28 and relevant gateways 30, 32 to create an automatic subscription to all device applications that have the same link-subscription identifier on behalf of network applications.

To that effect, the network application 12, 14 issues a subscription request to the M2M SC platform 28 including a particular link-subscription identifier. The M2M SC 28 then issues an identical request, in one embodiment, to all M2M gateways 30, 32 (for applications executing on "hidden" devices 16, 18, 24, 26) and all M2M remote devices 20, 22 that connect directly to the M2M SC 28, that are registered to the M2M SC 28. In another embodiment, the M2M SC 28 issues such requests only to relevant gateways 30, 32 and devices 20, 22. In either case, the gateways 30, 32 and devices 20, 22 in turn locate all the device applications that have the same link-subscription identifier, and the M2M SC 28 creates a subscription accordingly.

Figure 2:
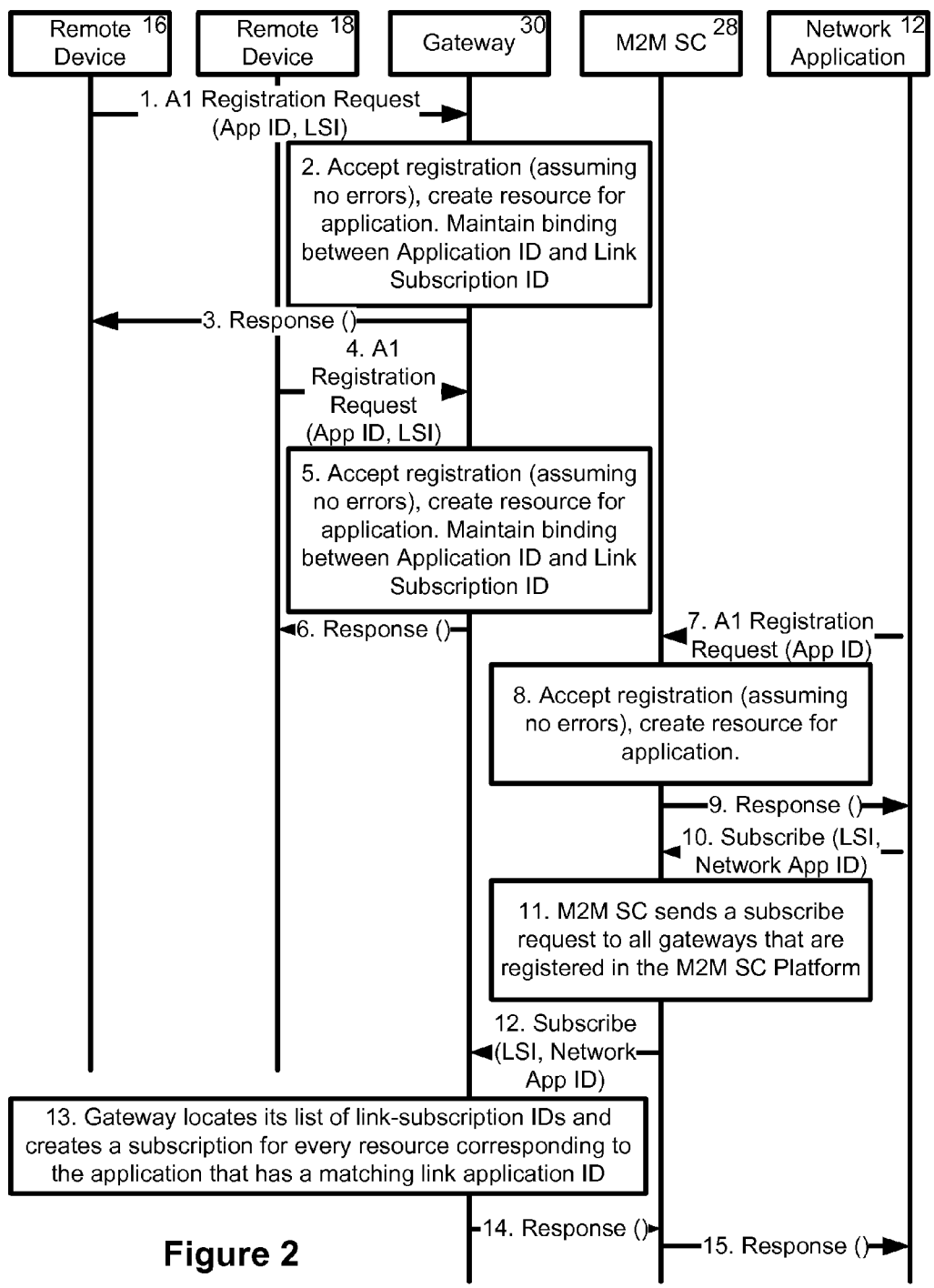
FIG. 2 is a message flow diagram for the M2M network according to an embodiment.

FIG. 2 depicts the operation of such a M2M network 12, according to a first embodiment of the present invention. At step 1, a device application executing on a remote device 16 requests a registration with a M2M gateway 30. The registration request includes a unique application identifier and a link-subscription identifier common to related device applications (e.g., utility meter reading applications). At step 2, the gateway 30 accepts the registration (assuming no errors), and maintains a binding between the application identifier and the link-subscription identifier. The gateway 30 responds to the registration request at step 3.

Similarly, at step 4, a device application executing on a different remote device 18 requests a registration with the M2M gateway 30. The second device application is related to the first device application (e.g., also a utility meter reading application), and it includes the same link-subscription identifier in its registration request (along with a unique application identifier). At step 5, the M2M gateway 30 adds the identifier of the application executing on device 18 to the binding to the shared link-subscription identifier, joining that of the application executing on device 16, and responds to the registration request at step 6. A large number of related device applications may register with M2M gateways 30, 32, or directly to the M2M SC 28, in a similar fashion, each including a shared link-subscription identifier in its registration request in addition to the application identifier.

Some time later, at step 7, a M2M network application 12 (e.g., an application executed by a utility to collect and process meter readings) requests registration with the M2M SC 28. The request includes a unique application identifier. At step 8, the M2M SC 28 registers the network application 12, and returns an appropriate response at step 9.

At some time, as depicted at step 10, the M2M network application 12 subscribes to a service provided by the M2M SC 28, such as a device application registration status subscription. The subscription request includes an application identifier unique to the M2M network application 12, and additionally includes the link-subscription identifier shared by the first and second (and possibly many other) device applications described above. At step 11, the M2M SC 28 validates that the link-subscription identifier is one that belongs to the network application 12, and sends a subscription request to all gateways 30, 32 and remote devices 20, 22 that are registered to the M2M SC 28. with the same link-subscription identifier The subscription request, depicted at step 12, includes the M2M network application identifier and the link-subscription identifier. One skilled in the art will appreciate that although the illustrated embodiment of the figure in question shows only one subscription to the gateway 30, the M2M SC 28 can issue multiple subscriptions to relevant M2M nodes if necessary.

At step 13, each M2M gateway 30, 32 accesses a list of link-subscription identifiers and compares the list to the link-subscription identifier included in the subscription request. If a match is detected, the M2M gateway 30, 32 creates a subscription for every device application 16, 18, 24, 26 registered to the M2M gateway 30, 32 that is bound to the link-subscription identifier. The M2M gateway 30 sends a response to the M2M SC 28 at step 14, which in turn sends a response to the M2M network application 12 at step 15.

In this manner, a M2M network application 12 is able to subscribe to a service, such as registration events, of a potentially very large plurality of device applications executing on remote devices 16-26. This obviously reduces—perhaps dramatically—the overhead that would otherwise be incurred if the M2M network application 12 were forced to discover each relevant device application, and issue a separate subscription request to each one.

The link-subscription identifier may be distributed to relevant device applications executing on remote devices 16-26 in a number of ways. For example, the link-subscription identifier may be provisioned in the remote devices 16-26, e.g., in SIM card memory, by the M2M network 10 at the remote devices' 16-26 manufacturer or deployment. Alternatively, the link-subscription identifier may be provided (or updated) to remote devices 16-26 dynamically, such as via SMS messages or other protocol. In general, any known method of distribution and management of identifiers may be employed within the scope of embodiments of the present invention.

As mentioned numerous times above, the number of gateways 30, 32 and network applications executing on remote devices 16-26 can be very large. A second embodiment of the present invention includes an optimization that further reduces overhead in the M2M network 12. According to this embodiment, upon registration, gateways 30, 32 and remote devices 20, 22 include an additional attribute—referred to herein as a link-subscription inventory attribute—that includes a list of links-subscription identifiers stored locally at gateway 30, 32. The link-subscription inventory attribute may be updated, as necessary, using the normal attribute update procedures in the M2M network 10. This allows the M2M SC 28 to locate only the gateways 30, 32 and remote devices 20, 22 to which a subscription (including a link-subscription identifier) should be sent—as opposed to sending the subscription to all gateways and devices registered with the M2M SC 28, as in the first embodiment described above.

Figure 3:
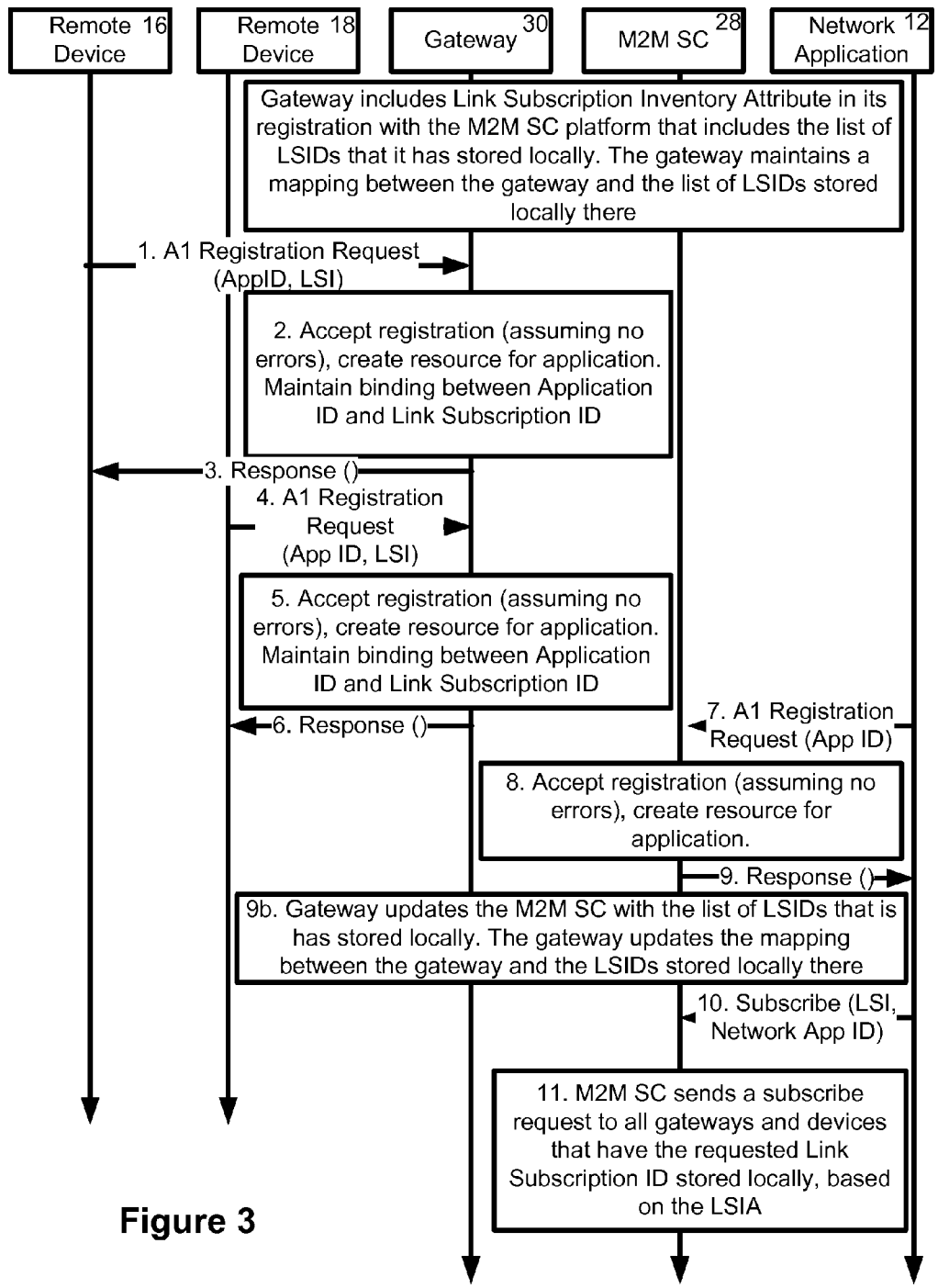
FIG. 3 is a message flow diagram for the M2M network according to an embodiment.
Figure 3:
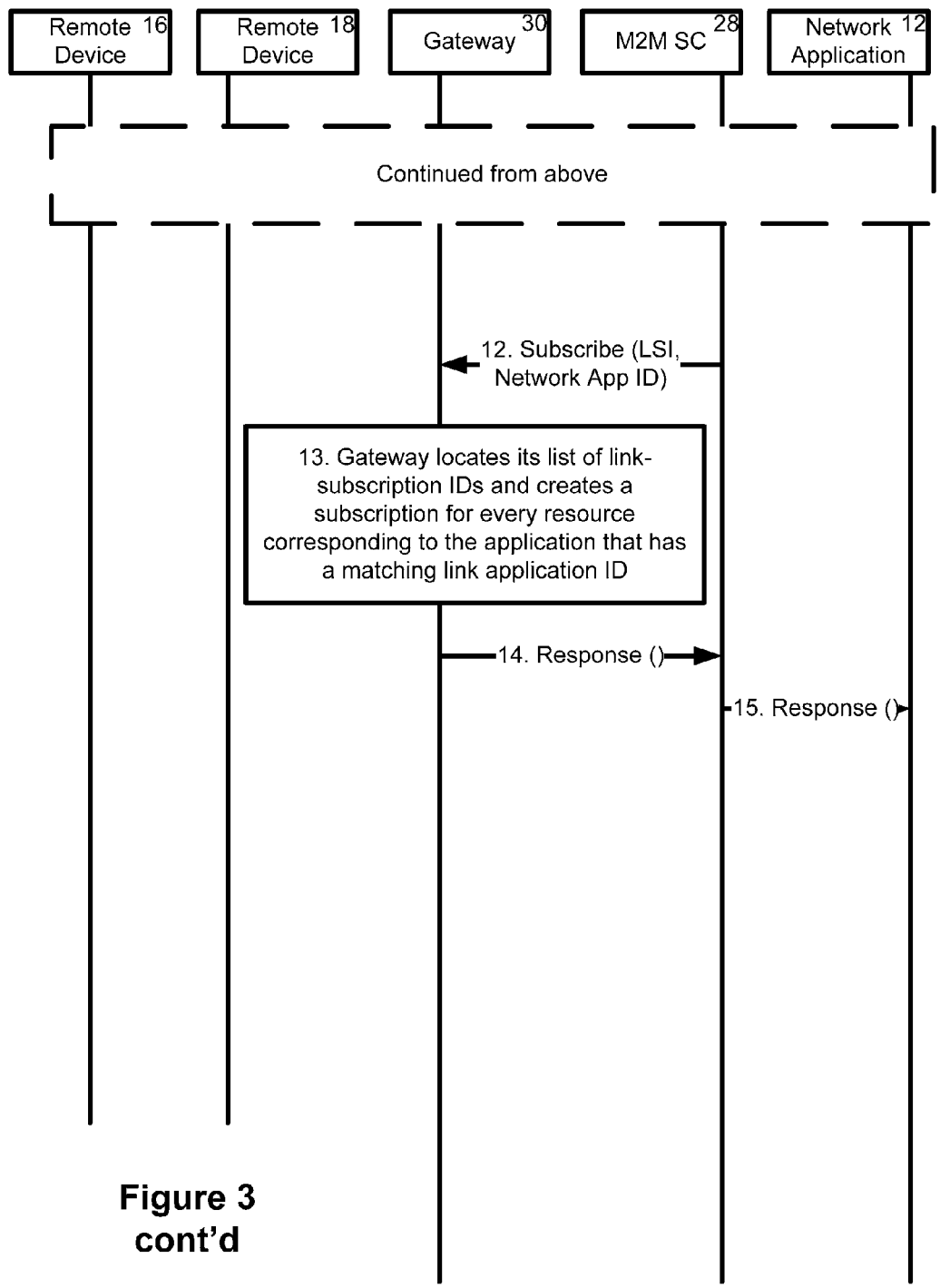

FIG. 3 depicts the operation of a M2M network 12, according to a second embodiment of the present invention. Initially, when each gateway 30, 32 or remote device 20, 22 registered with the M2M SC 28, the registration request included a link-subscription inventory attribute that included a list of the link-subscription identifiers stored locally. Each gateway 30, 32 or remote device 20, 22 dynamically maintains a list of link-subscription identifiers, and updates the link-subscription inventory attribute at the M2M SC 28 as necessary. As in the first embodiment, each gateway 30, 32 or remote device 20, 22 maintains, for each link-subscription identifier in the list, a binding to a list of device applications associated with the link-subscription identifier.

At step 1, a device application executing on a remote device 16 requests a registration with its associated M2M gateway 30. The registration request includes a unique application identifier and a link-subscription identifier common to related device applications (e.g., utility meter reading applications). At step 2, the gateway 30 accepts the registration (assuming no errors), and maintains a binding between the application identifier and the link-subscription identifier. The gateway 30 responds to the registration request at step 3.

Similarly, at step 4, a device application executing on a different remote device 18 requests a registration with the M2M gateway 30. The second device application is related to the first device application (e.g., also a utility meter reading application), and it includes the same link-subscription identifier in its registration request (along with a unique application identifier). At step 5, the M2M gateway 30 adds the identifier of the application executing on device 18 to the binding to the shared link-subscription identifier, joining that of the application executing on device 16, and responds to the registration request at step 6. A large number of related device applications may register with M2M gateways 30, 32, or directly to the M2M SC 28, in a similar fashion, each including a shared link-subscription identifier in its registration request.

Some time later, at step 7, a M2M network application 12 (e.g., an application executed by a utility to collect and process meter readings) requests registration with the M2M SC 28. The request includes a unique application identifier. At step 8, the M2M SC 28 registers the network application 12, and returns an appropriate response at step 9.

At any time—depicted here as step 9b—if a device application registers with a gateway 30, 32 or begins execution on a remote device 20, 22 using a new link-subscription identifier, the gateway 30, 32 or remote device 20, 22 adds the new link-subscription identifier to its list of locally-stored link-subscription identifiers, and updates its link-subscription inventory attribute at the M2M SC 28, using known signaling. Hence, the M2M SC 28, via the various link-subscription inventory attributes, is dynamically aware of the network-topology location (at least down to the level of gateways 30, 32) of all device applications associated with each link-subscription identifier.

At some time, as depicted at step 10, the M2M network application 12 subscribes to a service provided by the M2M SC 28, such as a device application registration status subscription. The subscription request includes an application identifier unique to the M2M network application 12, and additionally includes the link-subscription identifier shared by the first and second (and possibly many other) device applications described above.

At step 11, the M2M SC 28 inspects the link-subscription inventory attributes of all registered gateways 30, 32 and remote devices 20, 22, and identifies those that maintain a binding to the link-subscription identifier included in the subscription request. At step 12, the M2M SC 28 sends a subscription request, including the application identifier of the M2M network application 12 requesting the subscription and the shared link-subscription identifier, only to those gateways 30, 32 and remote devices 20, 22 identified as locally storing the link-subscription identifier. This is in contrast to the first embodiment described above, wherein the M2M SC 28 sends a subscription request to all registered gateways 30, 32 and remote devices 20, 22. Thus, it is clear that the second embodiment incurs less overhead, eliminating signaling to those gateways 30, 32 and remote devices 20, 22 that do not maintain bindings to any device applications associated with the link-subscription identifier.

At step 13, each M2M gateway 30, 32 or remote device 20, 22 receiving the subscription request accesses its list of device applications bound to the link-subscription identifier, and creates a subscription for each such device application. The M2M gateway 30 sends a response to the M2M SC 28 at step 14, which in turn sends a response to the M2M network application 12 at step 15.

In this manner, a M2M network application 12 is able to establish subscriptions to a potentially very large plurality of applications executing on remote devices 16-26, while avoiding not only the overhead of discovering and subscribing to each one individually, but additionally avoiding the overhead of sending subscription requests to every gateway 30, 32 or remote device 20, 22 registered to the M2M SC 28. Rather, subscription requests are sent only to the gateways 30, 32 and remote devices 20, 22 known to maintain a registration of, or to execute, a device application associated with the link-subscription identifier.

FIG. 3 depicts a method 100, executed by a M2M network gateway 30, 32, of subscribing one or more device applications executing on remote devices 16, 18, 24, 26 to a M2M network application 12. Those of skill in the art will recognize that M2M network 10 operation is an ongoing process, and the specific steps of the method 100 may, in various implementations, the executed in a different order than presented in FIG. 3.

The gateway 30, 32 registers to a M2M SC 28 (block 102). In one embodiment, the registration includes a link-subscription inventory attribute listing the link-subscription identifiers for which bindings to device applications are maintained by the gateway 30, 32. The gateway 30, 32 accept a registration from a device application executing on remote device 16, 18, 24, 26 (block 104). The registration includes an application identifier uniquely identifying the device application, and a link-subscription identifier shared among related device applications (e.g., utility meter reading applications). The gateway 30, 32 maintains a binding between the link script identifier and the application identifiers of all device applications, the registration of which included the shared link-subscription identifier (block 106).

In the embodiment in which the registration of the gateway 30, 32 to the M2M SC 28 (at block 102) included a link-subscription inventory attribute, the gateway 30, 32 determines whether the link-subscription identifier of the newly-registered device application is a new link-subscription identifier (block 108). If so, the gateway 30, 32 performs an attribute update to the M2M SC 28, to update the value of its link-subscription inventory attribute to include the new link-subscription identifier (block 110). If the link-subscription identifier of the newly-registered device application is one for which the gateway 30, 32 already maintains bindings to device applications, no attribute update is performed. Blocks 108 and 100 in FIG. 3 are rendered in dashed lines, indicating that they only apply in one embodiment of the present invention (in which the gateway 30, 32 includes a link-subscription inventory attribute when it registers with the M2M SC 28).

At some point, the gateway 30, 32 receives a subscription request including a link-subscription identifier from the M2M SC 28 (block 112). The gateway 30, 32 compares the link-subscription identifier in the subscription request to the list of link-subscription identifiers for which it locally maintains bindings to device applications. If the link-subscription identifier matches one of the locally-maintained link-subscription identifiers (block 114), then in the gateway 30, 32 issues a subscription request to each registered device 16, 18, 24, 26 executing a device application bound to that link-subscription identifier (block 116). Otherwise, the gateway 30, 32 ignores the subscription request from the M2M SC 28. Of course, in the embodiment wherein the gateway 30, 32 included a link-subscription inventory attribute with its registration to the M2M SC 28, the gateway 30, 32 will only receive the subscription request from the M2M SC 28 if the link-subscription identifier was included in its link-subscription inventory attribute.

Figure 4:
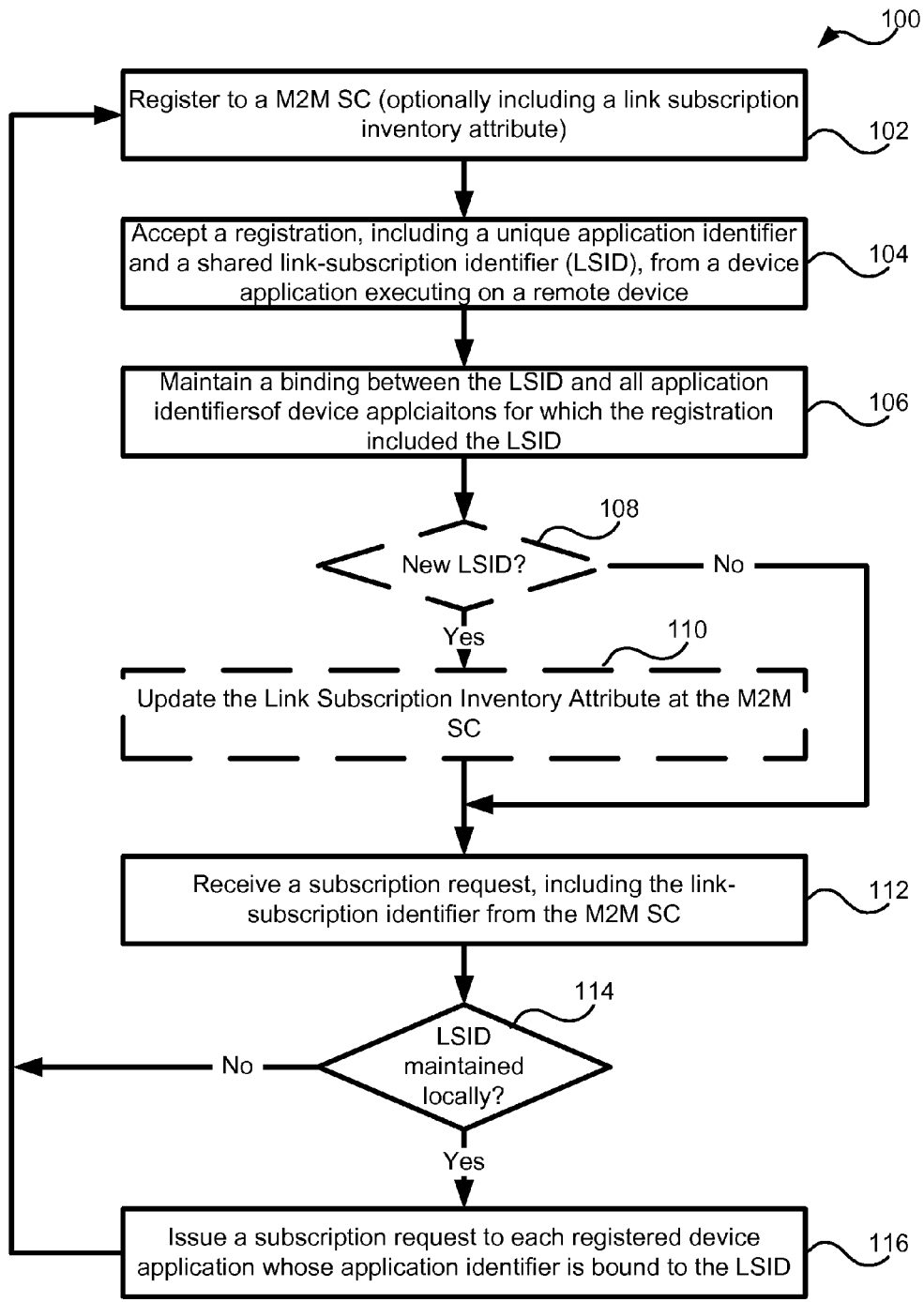
FIG. 4 is a flow diagram of a method of operation of a gateway in a M2M network.

FIG. 4 depicts a method 200, executed by a M2M SC 28, of subscribing a plurality of M2M device applications executing on remote devices 16-26 to a M2M network application 12. The M2M SC 28 accepts a registration from a M2M network application 12 (block 202). The registration includes a unique application identifier. The M2M SC 28 also accepts registrations from one or more—and potentially a large number of—gateways 30, 32 and/or remote devices 20, 22 (block 204). In one embodiment, these registrations each include a link-subscription inventory attribute listing the link-subscription identifiers maintained at each gateway 30, 32 or remote device 20, 22 and bound to device applications.

At some point, the M2M SC 28 accepts a subscription request, including a link-subscription identifier, from the M2M network application 12 (block 206). In response, the M2M SC 28 issues subscription requests, including the link-subscription identifier, to some or all gateways 30, 32 and remote devices 20, 22 registered to the M2M SC 28 (block 208). In one embodiment, the M2M SC 28 issues the subscription requests to all registered gateways 30, 32 and remote devices 20, 22. In another embodiment, in which the gateway 30, 32 and remote device 20, 22 registrations to the M2M SC 28 included a link-subscription inventory attribute listing locally-maintained link-subscription identifiers, the M2M SC 28 issues of subscription requests only to the gateways 30, 32 and remote devices 20, 22 whose link-subscription inventory attributes include the link-subscription identifier.

Figure 5:
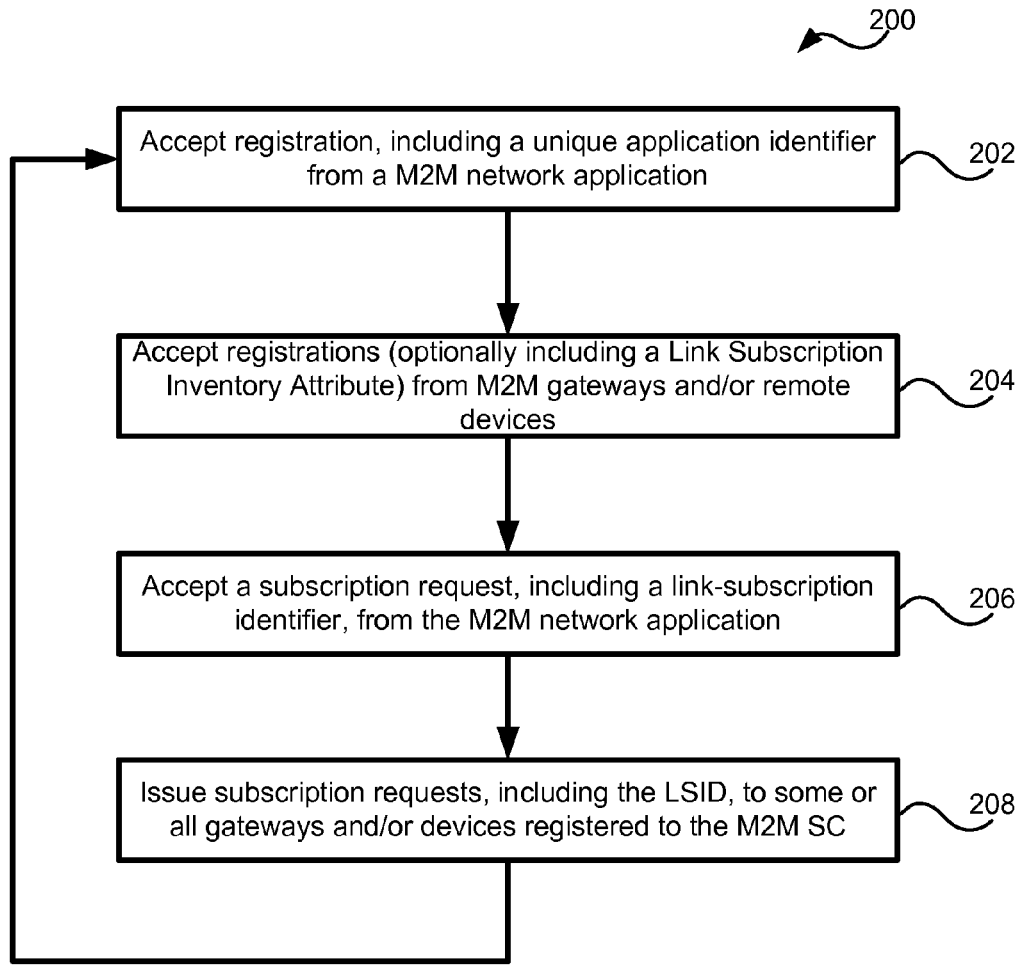
FIG. 5 is a flow diagram of a method of operation of a M2M services capability in a M2M network.
Figure 6:
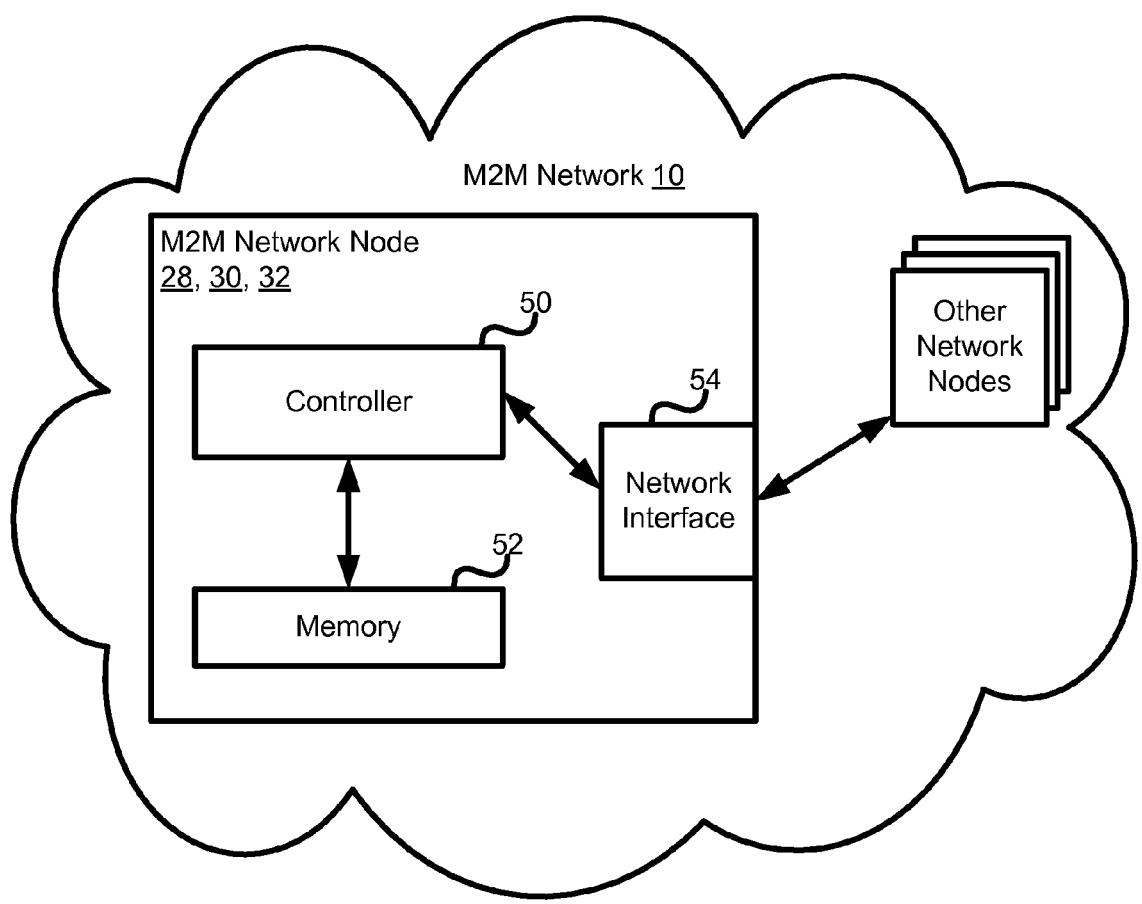
FIG. 6 is a functional block diagram of a M2M network node.

FIG. 5 depicts a M2M network node 28, 30, 32. The node 28, 30, 32 may be configured and operated as a M2M SC 28, or as a M2M gateway 30, 32. The node 28, 30, 32 includes a controller 50 operatively coupled to memory 52. The controller 50 is additionally connected to one or more network interfaces 54 operative to transmit and receive messages to and from other M2M network 10 nodes, such as registration or subscription requests or responses.

The controller 50 may comprise any sequential state machine operative to execute machine instructions stored as machine-readable computer programs in the memory 52, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory 52 may comprise any nontransient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, etc.), or the like.

In a further embodiment of the present invention, the usage of a link-subscriber identifier is extended to communications between a M2M network application 12 and a large number of device applications executing on remote devices 16-26 (as opposed to a M2M subscription). As described above, the related device applications 16-26 all share the same link-subscription identifier. The M2M network application 12—which also shares the link-subscription identifier—registers with the M2M SC 28 as described above. To "broadcast" information to all related device applications, the network application 12 may send a single write request (in lieu of a subscription request as describe above) to M2M SC 28, the write request including the link-subscription identifier. The M2M SC 28 then sends that write request to all registered gateways 30, 32 and remote devices 20, 22 (first embodiment) or all registered gateways 30, 32 and remote devices 20, 22 known to maintain the link-subscription identifier (second embodiment). The respective gateways 30, 32 and remote devices 20, 22 then forward the information to the device applications sharing the same link-subscription identifier. For example, the network application 12 may, in this manner, "broadcast" to the device applications associated with the link-subscription identifier, a code or command directing them to obtain and report a current utility meter reading as opposed to sending individual requests to each device application.

In a still further embodiment of the present invention, the usage of a link-subscriber identifier is extended to communications between device applications. That is, a device application may initiate the request rather than a M2M network application 12, 14. In this case, the call flow will differ slightly since the gateway 30, 32 or remote device 20, 22 must forward the service request to the M2M SC 28, which would then perform a M2M services processing as described above. Note, however, in this case, the M2M SC 28 would avoid sending the request (e.g., subscription, write, or the like) back to the originating gateway 30, 32 or remote device 20, 22.

In general, those of skill in the art may readily devise specific procedures and use cases exploiting the inventive concept of the use of a link-subscription identifier to avoid excessive (potentially massive) overhead in M2M networks 12, given the teachings of the present disclosure. All such modifications would, of course, fall within the scope of the present invention. Indeed, the embodiments described herein are to be considered in all respects as illustrative and not restrictive, and all changes coming within the meaning and equivalency range of the appended claims are intended to be embraced therein.

What is claimed is:

1. A method, by a Machine-to-Machine (M2) Service Capability (SC), of subscribing a plurality of M2M device applications executing on remote devices, comprising:
   accepting a registration from a M2M network application, the registration including a link-subscription identifier associated with the M2M network application, and shared by a plurality of related device applications;
   subsequently accepting a subscription request from the M2M network application, the subscription request including the link-subscription identifier; and
   issuing subscription requests to a plurality of gateways or devices registered to the M2M SC, the subscription requests including the link-subscription identifier.

2. The method of claim 1, further comprising, prior to issuing the subscription requests, accepting registrations from a plurality of gateways or remote devices, each registration including the link-subscription identifier.

3. The method of claim 1, further comprising accepting, from gateways or remote devices, subscription responses from a plurality of device applications associated with the link-subscription identifier.

4. The method of claim 2, wherein issuing subscription requests to a plurality of gateways or remote devices comprises issuing subscription requests to all gateways and remote devices registered to the M2M SC.

5. The method of claim 2,
   wherein the registration of each gateway or remote device to the M2M SC includes a link-subscription inventory attribute including a list of link-subscription identifiers maintained at the gateway or remote device; and
   wherein issuing subscription requests to a plurality of gateways or remote devices comprises issuing subscription requests only to gateways and remote devices registered to the M2M SC for which a link-subscription inventory attribute includes the link-subscription identifier.

6. The method of claim 5 further comprising accepting an update of a link-subscription inventory attribute from a registered gateway or remote device, the update including link-subscription identifiers associated with device applications registered to the gateway or executed by the remote device since the registration of the gateway or remote device to the M2M SC or the last update of the link-subscription inventory attribute.

7. A method, by a Machine-to-Machine (M2M) network gateway, of subscribing one or more device applications executing on remote devices to a M2M network application, comprising:

registering to a M2M Service Capability (SC);

accepting a registration request from a device application executing on a remote device, the registration request including an application identifier unique to the device application and a link-subscription identifier associated with the M2M network application, and shared by a plurality of related device applications;

maintaining a binding between each link-subscription identifier and all application identifiers of device applications, the registration request from which included the link-subscription identifier;

receiving a subscription request from the M2M SC, the subscription request including a first link-subscription identifier; and issuing a subscription request to each registered device application whose application identifier is bound to the first link-subscription identifier.

8. The method of claim 7 wherein registering to the M2M SC comprising sending to the M2M SC a registration request including a link-subscription inventory attribute, which includes a list of link-subscription identifiers maintained at the gateway.

9. The method of claim 8 further comprising updating the link-subscription inventory attribute at the M2M SC to include additional link-subscription identifiers associated with device applications registered to the gateway since the M2M SC registration or last attribute update.

10. A network node executing Machine-to-Machine (M2) Service Capability (SC) comprising:
one or more network interfaces;
memory; and
a controller operative to execute one or more programs operative to
accept a registration from a M2M network application, the registration including a link-subscription identifier associated with the M2M network application, and shared by a plurality of related device applications;
subsequently accept a subscription request from the M2M network application, the subscription request including the link-subscription identifier; and
issue subscription requests to a plurality of gateways or devices registered to the M2M SC, the subscription requests including the link-subscription identifier.

11. The node of claim 10, wherein the controller is further operative to, prior to issuing the subscription requests, accept registrations from a plurality of gateways or remote devices, each registration including the link-subscription identifier.

12. The node of claim 10, wherein the controller is further operative to accept, from gateways or remote devices, subscription responses from a plurality of device applications associated with the link-subscription identifier.

13. The node of claim 11, wherein the controller is operative to issue subscription requests to a plurality of gateways or remote devices by issuing subscription requests to all gateways and remote devices registered to the M2M SC.

14. The node of claim 11,
wherein the registration each gateway or remote device to the M2M SC includes a link-subscription inventory attribute including a list of link-subscription identifiers maintained at the gateway or remote device; and
wherein the controller is further operative to issue subscription requests to a plurality of gateways or remote devices by issuing subscription requests only to gateways and remote devices registered with the M2M SC for which a link-subscription inventory attribute includes the link-subscription identifier.

15. The node of claim 14 wherein the controller is operative to accept an update of a link-subscription inventory attribute from a registered gateway or remote device, the update including link-subscription identifiers associated with device applications registered to the gateway or executed by the remote device since the registration of the gateway or remote device to the M2M SC or the last update of the link-subscription inventory attribute.

16. A Machine-to-Machine (M2M) network gateway operative to register to a M2M Service Capability (SC), comprising:
one or more network interfaces;
memory; and
a controller operative to execute one or more programs operative to register to a M2M SC;
accept a registration request from a device application executing on a remote device, the registration request including an application identifier unique to the device application and a link-subscription identifier associated with the M2M network application, and shared by a plurality of related device applications;
maintain a binding between each link-subscription identifier and all application identifiers of device applications, the registration request from which included the link-subscription identifier;
receive a subscription request from the M2M SC, the subscription request including a first link-subscription identifier; and
issue a subscription request to each registered device application whose application identifier is bound to the first link-subscription identifier.

17. The gateway of claim 16 wherein the controller is operative to register to the M2M SC by sending to the M2M SC a registration request including a link-subscription inventory attribute, which includes a list of link-subscription identifiers maintained at the gateway.

18. The gateway of claim 17 wherein the controller is further operative to update the link-subscription inventory attribute at the M2M SC to include additional link-subscription identifiers associated with device applications registered to the gateway since the M2M SC registration or last attribute update.

\* \* \* \* \*